(12) United States Patent
Sumnicht

(10) Patent No.: US 7,951,264 B2
(45) Date of Patent: May 31, 2011

(54) ABSORBENT CELLULOSIC PRODUCTS WITH REGENERATED CELLULOSE FORMED IN-SITU

(75) Inventor: Daniel W. Sumnicht, Green Bay, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 573 days.

(21) Appl. No.: 11/971,240

(22) Filed: Jan. 9, 2008

(65) Prior Publication Data
US 2008/0173418 A1    Jul. 24, 2008

Related U.S. Application Data

(60) Provisional application No. 60/881,393, filed on Jan. 19, 2007, provisional application No. 60/881,310, filed on Jan. 19, 2007, provisional application No. 60/994,344, filed on Sep. 19, 2007, provisional application No. 60/994,483, filed on Sep. 19, 2007.

(51) Int. Cl.
*D21H 13/28* (2006.01)
*D21H 27/02* (2006.01)

(52) U.S. Cl. .................. 162/146; 162/157.7; 162/184

(58) Field of Classification Search ............... 162/157.7, 162/184, 146
See application file for complete search history.

(56) References Cited

U.S. PATENT DOCUMENTS

| | | | | |
|---|---|---|---|---|
| 2,428,046 A | 9/1947 | Sisson et al. | ............ | 28/82 |
| 2,440,761 A | 5/1948 | Sisson et al. | ............ | 18/8 |
| 2,880,111 A * | 3/1959 | Griswold et al. | ....... | 428/195.1 |
| 3,009,822 A * | 11/1961 | Griswold et al. | ....... | 428/195.1 |
| 3,175,339 A | 3/1965 | McDowell | ............ | 55/74 |
| 3,508,945 A | 4/1970 | Haemer et al. | ............ | 117/8 |
| 3,616,797 A * | 11/1971 | Champaigne et al. | ....... | 604/364 |
| 3,994,771 A | 11/1976 | Morgan, Jr. et al. | ....... | 162/113 |
| 4,102,737 A | 7/1978 | Morton | ................ | 162/113 |
| 4,246,221 A | 1/1981 | McCorsley, III | ............ | 264/203 |
| 4,267,047 A | 5/1981 | Henne et al. | ............ | 210/490 |
| 4,426,228 A * | 1/1984 | Brandner et al. | ....... | 106/200.3 |
| 4,529,480 A | 7/1985 | Trokhan | ............ | 162/109 |
| 4,735,849 A | 4/1988 | Murakami et al. | ....... | 428/224 |
| 4,802,942 A | 2/1989 | Takemura et al. | ....... | 156/244.13 |
| 5,124,197 A | 6/1992 | Bernardin et al. | ....... | 428/284 |
| 5,607,551 A | 3/1997 | Farrington, Jr. et al. | ....... | 162/109 |
| 5,688,468 A | 11/1997 | Lu | ................ | 264/555 |
| 5,759,926 A | 6/1998 | Pike et al. | ............ | 442/333 |
| 5,769,947 A | 6/1998 | Krappweis | ............ | 118/411 |

(Continued)

FOREIGN PATENT DOCUMENTS

CA       841938 A    *    5/1970

OTHER PUBLICATIONS

Anwsers.com, Defintion of Filament, downloaded online Oct. 21, 2010.*

(Continued)

*Primary Examiner* — Matthew J Daniels
*Assistant Examiner* — Anthony J Calandra
(74) *Attorney, Agent, or Firm* — Laura L. Bozek (57) ABSTRACT

A method of making absorbent cellulosic sheet includes forming a web of papermaking fibers, extruding a cellulosic dope of underivatized cellulose, disposing the dope upon the web and regenerating the cellulose in-situ. Regenerated filaments may have a denier of from about 0.05 to about 20.

20 Claims, 3 Drawing Sheets

U.S. PATENT DOCUMENTS

| | | | | |
|---|---|---|---|---|
| 5,882,573 | A | 3/1999 | Kwok et al. | 264/510 |
| 5,895,710 | A | 4/1999 | Sasse et al. | 442/334 |
| 5,902,540 | A | 5/1999 | Kwok | 264/555 |
| 5,904,298 | A | 5/1999 | Kwok et al. | 239/135 |
| 6,051,335 | A * | 4/2000 | Dinh-Sybeldon et al. | 429/142 |
| 6,063,717 | A | 5/2000 | Ishiyama et al. | 442/387 |
| 6,187,137 | B1 | 2/2001 | Druecke et al. | 162/109 |
| 6,235,392 | B1 | 5/2001 | Luo et al. | 428/369 |
| 6,550,115 | B1 | 4/2003 | Skoog et al. | 28/104 |
| 6,808,557 | B2 | 10/2004 | Holbrey et al. | 106/163.01 |
| 7,056,386 | B2 | 6/2006 | Pahl | 118/301 |
| 7,718,036 | B2 * | 5/2010 | Sumnicht et al. | 162/146 |
| 2002/0168912 | A1 | 11/2002 | Bond et al. | 442/415 |
| 2003/0157351 | A1 * | 8/2003 | Swatloski et al. | 428/478.4 |
| 2003/0203695 | A1 | 10/2003 | Polanco et al. | 442/365 |
| 2004/0038031 | A1 | 2/2004 | Holbrey et al. | 428/402.24 |
| 2005/0045095 | A1 * | 3/2005 | Pahl | 118/313 |
| 2005/0176326 | A1 * | 8/2005 | Bond et al. | 442/335 |
| 2005/0288484 | A1 | 12/2005 | Holbrey et al. | 528/480 |
| 2006/0090271 | A1 | 5/2006 | Price et al. | 8/490 |
| 2006/0207722 | A1 | 9/2006 | Amano et al. | 156/327 |
| 2006/0240727 | A1 | 10/2006 | Price et al. | 442/59 |
| 2006/0240728 | A1 | 10/2006 | Price et al. | 442/59 |
| 2006/0241287 | A1 | 10/2006 | Hecht et al. | 530/356 |
| 2007/0137808 | A1 * | 6/2007 | Lostocco et al. | 162/109 |

OTHER PUBLICATIONS

Konig et al., Chem. Commun. 2005, 1170-1172.

* cited by examiner

ABSORBENT CELLULOSIC PRODUCTS WITH REGENERATED CELLULOSE FORMED IN-SITU

CLAIM FOR PRIORITY

This application is based upon U.S. Provisional Patent Application No. 60/881,393, of the same title, filed Jan. 19, 2007; U.S. Provisional Patent Application Ser. No. 60/881,310, entitled "Method of Making Regenerated Cellulose Microfibers and Absorbent Products Incorporating Same", filed Jan. 19, 2007; U.S. Provisional Patent Application Ser. No. 60/994,344, entitled "Absorbent Sheet Incorporating Regenerated Cellulose Microfiber", filed Sep. 19, 2007; and U.S. Provisional Patent Application Ser. No. 60/994,483, entitled "High Efficiency Disposable Cellulosic Wiper", filed Sep. 19, 2007. The priorities of U.S. Provisional Patent Application Ser. Nos. 60/881,393; 60/881,310; 60/994,344 and 60/994,483 are hereby claimed and the disclosures thereof are incorporated into this application by reference.

TECHNICAL FIELD

The present invention relates to absorbent cellulosic products with regenerated cellulose formed in-situ upon a web of papermaking fibers from a cellulosic dope. Preferably, the regenerated cellulose is in the form of discrete filaments bonded with papermaking fibers in the web.

BACKGROUND

Regenerated cellulosic fibers, sometimes referred to as semi-synthetics or cellulosics are known in the art. Rayon is made by way of the viscose process which involves reacting cellulose with a concentrated solution of sodium hydroxide to form soda cellulose followed by reacting the soda cellulose with carbon disulfide to form sodium cellulose xanthate. The sodium cellulose xanthate is dissolved in a dilute solution of sodium hydroxide to give a viscose solution which is aged and then extruded through spinerettes into dilute sulfuric acid, which regenerates the cellulose in the form of continuous filaments. Methods of making rayon are reviewed in a 1985 non-wovens symposium paper entitled "The Manufacture, Properties and Uses of Inflated Viscose Rayon Fibers" authored by Woodings et al. Also noted is U.S. Pat. No. 5,124,197 of Bernardin et al.

Cellulose acetate and triacetate fibers are produced by dry spinning cellulose acetate dissolved in acetone and/or a chlorinated hydrocarbon.

Existing commercial processes involving derivatized cellulose are not generally suitable for forming regenerated cellulosic fibers in-situ with other papermaking fibers due to solvent usage and complexity of the processes. Moreover, reactive spinning such as the viscose process and dry solvent spinning are not environmentally friendly processes because of solvent disposal issues and volatile organic vapors.

SUMMARY OF INVENTION

In one aspect, the present invention is directed to a method of making absorbent cellulosic sheet such as tissue or towel including the steps of: forming a web of papermaking fibers; extruding a cellulosic dope; disposing the extruded dope upon the web; and regenerating cellulose from the dope in-situ in the web. The cellulosic dope includes underivatized cellulose dissolved in a cellulose-dissolving solvent composition selected such that the cellulosic dope may be regenerated by contacting it with water. Optionally included in the regeneration process is a liquid non-solvent for the cellulose which is miscible with the solvent composition, such as alkanols and the like if so desired. Chemicals which are reactive to the dope are not required for regeneration and are avoided.

Preferably, the process is controlled to provide discreet, regenerated cellulose filaments upon the web bonded to the papermaking fibers. The regenerated cellulose filaments may be arranged in a sinuate pattern such as a sinusoidal pattern or, the regenerated cellulose filaments may be formed in a network in the web. For example, there is provided in one embodiment, an X pattern network while in another embodiment there is provided a circular network pattern of regenerated cellulosic filaments in the web. If so desired, the regenerated cellulose filaments may be hydro-entangled with the papermaking fibers. Likewise, the cellulose may be regenerated by applying water to the web, or the cellulosic dope may be applied to the forming wire while the sheet is being formed in an aqueous environment.

In one embodiment, the cellulosic dope is extruded as discrete filaments which are pneumatically drawn prior to contacting them with the web.

The solvent composition for cellulosic dope may include a cellulosic-dissolving ionic liquid such as a dialkylimidazolium salt, for example, 1-allyl-3-methylimidazolium chloride. Alternatively, the solvent composition comprises a cellulose-dissolving tertiary amine oxide such as N-methyl-morpholine-N-oxide (NMMO). Optionally, the solvent composition includes a non-solvent for the cellulose such as water, alkanols or other organic solvent.

In another aspect of the invention, there is provided an absorbent cellulosic sheet comprising a web of pulp-derived papermaking fibers having disposed thereupon discreet filaments of regenerated cellulose. The discreet filaments of regenerated cellulose are derived from a cellulosic dope comprising underivatized cellulose dissolved in an ionic liquid or a cellulose-dissolving tertiary amine oxide and are regenerated in-situ upon the web. The discreet filaments of regenerated cellulose may have a denier of from about 0.05 to about 20 g/9000 meters. For example, a denier of from about 0.1 to about 10 is typical. The web of papermaking fibers may be an air-laid web of papermaking fibers or a wet-laid web of papermaking fibers. So also, the cellulosic sheet may be fabric creped, blade creped, or uncreped as further described herein.

Typical products have a basis weight of from about 5 lbs/3000 ft² ream to about 50 lbs/3000 ft² ream. In many cases the product will have a basis weight of from about 7.5 lbs/3000 ft² ream to about 35 lbs/3000 ft² ream.

Further details and aspects of the present invention are described in more detail below.

BRIEF DESCRIPTION OF DRAWINGS

The invention is described with reference to the drawings, wherein.

DETAILED DESCRIPTION

The invention is described in detail below with reference to several embodiments. Such discussion is for purposes of illustration only.

Terminology used herein is given its ordinary meaning consistent with the exemplary definitions set forth immediately below; mg refers to milligrams and $m^2$ refers to square meters, mBar means milliBar ($\frac{1}{1000}$Bar) and so forth. Unless otherwise specified, % means weight percent. Unless otherwise specified, "basis weight", BWT, bwt and so forth refers to the weight of a 3000 square foot ream of product.

The term "cellulosic", "cellulosic sheet" and the like is meant to include any product incorporating papermaking fiber having cellulose as a major constituent. "Papermaking fibers" include virgin pulps or recycle (secondary) cellulosic fibers or fiber mixes comprising cellulosic fibers. Fibers suitable for making the webs of this invention include: nonwood fibers, such as cotton fibers or cotton derivatives, abaca, kenaf, sabai grass, flax, esparto grass, straw, jute hemp, bagasse, milkweed floss fibers, and pineapple leaf fibers; and wood fibers such as those obtained from deciduous and coniferous trees, including softwood fibers, such as northern and southern softwood Kraft fibers; hardwood fibers, such as eucalyptus, maple, birch, aspen, or the like. Papermaking fibers used in connection with the invention are typically naturally occurring pulp-derived fibers (as opposed to reconstituted fibers such as lyocell or rayon) which are liberated from their source material by any one of a number of pulping processes familiar to one experienced in the art including sulfate, sulfite, polysulfide, soda pulping, etc. The pulp can be bleached if desired by chemical means including the use of chlorine, chlorine dioxide, oxygen, alkaline peroxide and so forth. Naturally occurring pulp-derived fibers are referred to herein simply as "pulp-derived" papermaking fibers. The products of the present invention may comprise a blend of conventional fibers (whether derived from virgin pulp or recycle sources) and high coarseness lignin-rich tubular fibers, such as bleached chemical thermomechanical pulp (BCTMP). Pulp-derived fibers thus also include high yield fibers such as BCTMP as well as thermomechanical pulp (TMP), chemithermomechanical pulp (CTMP) and alkaline peroxide mechanical pulp (APMP). "Furnishes" and like terminology refers to aqueous compositions including papermaking fibers, optionally wet strength resins, debonders and the like for making paper products. The papermaking fibers are in many embodiments Kraft fibers, described below.

Kraft softwood fiber is low yield fiber made by the well known Kraft (sulfate) pulping process from coniferous material and includes northern and southern softwood Kraft fiber, Douglas fir Kraft fiber and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the Kraft process from hardwood sources, i.e., eucalyptus and also has generally a lignin content of less than 5 percent by weight. Kraft hardwood fibers are shorter than softwood fibers, typically having a length weighted average fiber length of less than 1 mm and an arithmetic average length of less than 0.5 mm or less than 0.4 mm.

"Cellulosic dope" means a viscous solution of dissolved cellulose.

"Denier" is a measure of fiber or filament coarseness and is in units of g/9000 m unless otherwise indicated.

Freezing point depressions of compositions are determined by calculating the melting point by rule of mixtures and subtracting the observed melting point of the composition.

"Non-solvent" for cellulose refers to liquids which will not dissolve cellulose without a cellulose-dissolving agent. Solvent compositions for dissolving cellulose may include suitable levels of non-solvents such as water, alkanols or other organic solvents or additives.

"Sinuate" means having bends or curves as opposed to being linear.

"Underivatized" cellulose refers to cellulose which has not been substantially derivatized, for example, esterified or xanthated.

Methods of making paper tissue, towel, and the like are well known, including various features such as Yankee drying, throughdrying, fabric creping, dry creping, wet creping and so forth. Conventional wet pressing/dry creping processes (CWP) have certain advantages over conventional through-air drying processes including: (1) lower energy costs associated with the mechanical removal of water rather than transpiration drying with hot air; and (2) higher production speeds which are more readily achieved with processes which utilize wet pressing to form a web. On the other hand, through-air drying processing has been widely adopted for new capital investment, particularly for the production of soft, bulky, premium quality tissue and towel products.

Throughdried, creped products and processes (TAD) are disclosed in the following patents: U.S. Pat. No. 3,994,771 to Morgan, Jr. et al.; U.S. Pat. No. 4,102,737 to Morton; and U.S. Pat. No. 4,529,480 to Trokhan. The processes described in these patents comprise, very generally, forming a web on a foraminous support, thermally pre-drying the web, applying the web to a Yankee dryer with a nip defined, in part, by an impression fabric, and creping the product from the Yankee dryer. A relatively permeable web is typically required, making it difficult to employ recycle furnish at levels which may be desired. Transfer to the Yankee typically takes place at web consistencies of from about 60% to about 70%. See, also, U.S. Pat. No. 6,187,137 to Druecke et al. which includes disclosure of peeling a web from a Yankee dryer. Uncreped, throughdried products are described in U.S. Pat. No. 5,607,551, to Farrington, Jr. et al., the disclosure of which is incorporated herein by reference.

Some newer processes including fabric-creping and the use of creping adhesives are described in the following co-pending applications: U.S. patent application Ser. No. 11/804,246, filed May 16, 2007, entitled "Fabric Creped Absorbent Sheet with Variable Local Basis Weight"; U.S. patent application Ser. No. 11/678,669, entitled "Method of Controlling Adhesive Build-Up on a Yankee Dryer"; U.S. patent application Ser. No. 11/451,112 (Publication No. US 2006/0289133), filed Jun. 12, 2006, entitled "Fabric-Creped Sheet for Dispensers"; U.S. Ser. No. 11/451,111, filed Jun. 12, 2006 (Publication No. US 2006/0289134), entitled "Method of Making Fabric-creped Sheet for Dispensers"; U.S. patent application Ser. No. 11/402,609 (Publication No. US 2006/0237154), filed Apr. 12, 2006, entitled "Multi-Ply Paper Towel With Absorbent Core"; U.S. patent application Ser. No. 11/151,761, filed Jun. 14, 2005 (Publication No. US 2005/0279471), entitled "High Solids Fabric-crepe Process for Producing Absorbent Sheet with In-Fabric Drying"; U.S. application Ser. No. 11/108,458, filed Apr. 18, 2005 (Publication No. US 2005/0241787), entitled "Fabric-Crepe and In Fabric Drying Process for Producing Absorbent Sheet"; U.S. application Ser. No. 11/108,375, filed Apr. 18, 2005 (Publication No. US 2005/0217814), entitled "Fabric-crepe/Draw Process for Producing Absorbent Sheet"; U.S. application Ser. No. 11/104,014, filed Apr. 12, 2005 (Publication No. US 2005/0241786), entitled "Wet-Pressed Tissue and Towel Products With Elevated CD Stretch and Low Tensile Ratios Made With a High Solids Fabric-Crepe Process"; U.S. application Ser. No. 10/679,862 (Publication No. US 2004/0238135), filed Oct. 6, 2003, entitled "Fabric-crepe Process for Making Absorbent Sheet"; U.S. Provisional Patent Application Ser. No. 60/903,789, filed Feb. 27, 2007, entitled "Fabric Crepe Process With Prolonged Production Cycle". The applications referred to immediately above are particularly relevant to the selection of machinery, materials, processing conditions and so forth as to fabric creped products of the present invention and the disclosures of these applications are incorporated herein by reference.

The present invention contemplates generally using webs of cellulosic fibers made by any known technique for making non-woven webs, such as air-laid non-woven webs, wet-laid non-woven webs and so forth. Moreover, the in-situ formed filaments of regenerated cellulose may be hydro-entangled if so desired. Various techniques and processes for forming and hydro-entangling webs of fibers are disclosed in the following United States Patents, the disclosures of which are incorporated herein by reference. U.S. Pat. No. 6,550,115 to Skoog et al. entitled "Method For Making a Hydraulically Entangled Composite Fabric"; U.S. Pat. No. 6,063,717 to Ishiyama et al. entitled "Hydroentangled Nonwoven Fabric and Method of Producing The Same"; and U.S. Pat. No. 5,688,468 of Lu entitled "Process for Producing Non-Woven Webs".

The solvent composition for dissolving cellulose and preparing underivatized cellulose dopes suitably includes tertiary amine oxides such as N-methylmorpholine-N-oxide (NMMO) and similar compounds enumerated in U.S. Pat. No. 4,246,221 to McCorsley, the disclosure of which is incorporated herein by reference. Suitable cellulosic dopes are enumerated in Table 1, below.

TABLE 1

EXAMPLES OF TERTIARY AMINE N-OXIDE SOLVENTS

| Tertiary Amine N-oxide | % water | % cellulose |
|---|---|---|
| N-methylmorpholine N-oxide | up to 22 | up to 38 |
| N,N-dimethyl-ethanol-amine N-oxide | up to 12.5 | up to 31 |
| N,N-dimethylcyclohexylamine N-oxide | up to 21 | up to 44 |
| N-methylhomopiperidine N-oxide | 5.5-20 | 1-22 |
| N,N,N-triethylamine N-oxide | 7-29 | 5-15 |
| 2(2-hydroxypropoxy)-N-ethyl-N,N,-dimethyl-amide N-oxide | 5-10 | 2-7.5 |
| N-methylpiperidine N-oxide | up to 17.5 | 5-17.5 |
| N,N-dimethylbenzylamine N-oxide | 5.5-17 | 1-20 |

See, also, U.S. Pat. No. 3,508,945 to Johnson, the disclosure of which is incorporated herein by reference.

Details with respect to preparation of cellulosic dopes including cellulose dissolved in suitable ionic liquids and cellulose regeneration therefrom are found in U.S. patent application Ser. No. 10/256,521; Publication No. US 2003/0157351 to Swatloski et al. entitled "Dissolution and Processing of Cellulose Using Ionic Liquids", the disclosure of which is incorporated herein by reference. There is described generally in this patent a process for dissolving cellulose in an ionic liquid without derivatization and regenerating the cellulose in a range of structural forms. It is reported that the cellulose solubility and the solution properties can be controlled by the selection of ionic liquid constituents with small cations and halide or pseudohalide anions favoring solution. Preferred ionic liquids for dissolving cellulose include those with cyclic cations such as the following cations: imidazolium; pyridinum; pyridazinium; pyrimidinium; pyrazinium; pyrazolium; oxazolium; 1,2,3-triazolium; 1,2,4-triazolium; thiazolium; piperidinium; pyrrolidinium; quinolinium; and isoquinolinium.

Processing techniques for ionic liquids/cellulose dopes are also discussed in U.S. Pat. No. 6,808,557 to Holbrey et al. entitled "Cellulose Matrix Encapsulation and Method", the disclosure of which is incorporated herein by reference. Note also U.S. patent application Ser. No. 11/087,496; Publication No. US 2005/0288484 to Holbrey et al. entitled "Polymer Dissolution and Blend Formation in Ionic Liquids" as well as U.S. patent application Ser. No. 10/394,989; Publication No. US 2004/0038031 to Holbrey et al. entitled "Cellulose Matrix Encapsulation and Method", the disclosures of which are incorporated herein by reference. With respect to ionic fluids in general the following documents provide further detail: U.S. patent application Ser. No. 11/406,620, Publication No. US 2006/0241287 to Hecht et al. entitled "Extracting Biopolymers From a Biomass Using Ionic Liquids"; U.S. patent application Ser. No. 11/472,724, Publication No. US 2006/0240727 to Price et al. entitled "Ionic Liquid Based Products and Method of Using The Same"; U.S. patent application Ser. No. 11/472,729; Publication No. US 2006/0240728 of Price et al. entitled "Ionic Liquid Based Products and Method of Using the Same"; U.S. patent application Ser. No. 11/263,391, Publication No. US 2006/0090271 of Price et al. entitled "Processes For Modifying Textiles Using Ionic Liquids"; and U.S. patent application Ser. No. 11/375,963 of Amano et al. (Publication No. US 2006/0207722), the disclosures of which are incorporated herein by reference. Some ionic liquids and quasi-ionic liquids which may be suitable are disclosed by Konig et al., Chem. Commun. 2005, 1170-1172, the disclosure of which is incorporated herein by reference.

"Ionic liquid", refers to a molten composition including an ionic compound that is preferably a stable liquid at temperatures of less than 100° C. at ambient pressure. Typically, such liquids have very low vapor pressure at 100° C., less than 75 mBar or so and preferably less than 50 mBar or 25 mBar at 100° C. Most suitable liquids will have a vapor pressure of less than 10 mBar at 100° C. and often the vapor pressure is so low it is negligible and is not easily measurable since it is less than 1 mBar at 100° C.

Suitable commercially available ionic liquids are Basionic™ ionic liquid products available from BASF (Florham Park, N.J.) and are listed in Table 2 below.

TABLE 2

Exemplary Ionic Liquids

| IL Abbreviation | Basionic ™ Grade | Product name | CAS Number |
|---|---|---|---|
| STANDARD | | | |
| EMIM Cl | ST 80 | 1-Ethyl-3-methylimidazolium chloride | 65039-09-0 |
| EMIM CH$_3$SO$_3$ | ST 35 | 1-Ethyl-3-methylimidazolium methanesulfonate | 145022-45-3 |
| BMIM Cl | ST 70 | 1-Butyl-3-methylimidazolium chloride | 79917-90-1 |
| BMIM CH$_3$SO$_3$ | ST 78 | 1-Butyl-3-methylimidazolium methanesulfonate | 342789-81-5 |
| MTBS | ST 62 | Methyl-tri-n-butylammonium methylsulfate | 13106-24-6 |
| MMMPZ MeOSO$_3$ | ST 33 | 1,2,4-Trimethylpyrazolium methylsulfate | |
| EMMIM EtOSO$_3$ | ST 67 | 1-Ethyl-2,3-di-methylimidazolium ethylsulfate | 516474-08-01 |
| MMMIM MeOSO$_3$ | ST 99 | 1,2,3-Trimethyl-imidazolium methylsulfate | 65086-12-6 |
| ACIDIC | | | |
| HMIM Cl | AC 75 | Methylimidazolium chloride | 35487-17-3 |
| HMIM HSO$_4$ | AC 39 | Methylimidazolium hydrogensulfate | 681281-87-8 |
| EMIM HSO$_4$ | AC 25 | 1-Ethyl-3-methylimidazolium hydrogensulfate | 412009-61-1 |
| EMIM AlCl$_4$ | AC 09 | 1-Ethyl-3-methylimidazolium tetrachloroaluminate | 80432-05-9 |
| BMIM HSO$_{4</}$ | AC 28 | 1-Butyl-3-methylimidazolium hydrogensulfate | 262297-13-2 |
| BMIM AlCl$_4$ | AC 01 | 1-Butyl-3-methylimidazolium tetrachloroaluminate | 80432-09-3 |
| BASIC | | | |
| EMIM Acetat | BC 01 | 1-Ethyl-3-methylimidazolium acetate | 143314-17-4 |
| BMIM Acetat | BC 02 | 1-Butyl-3-methylimidazolium acetate | 284049-75-8 |
| LIQUID AT RT | | | |
| EMIM EtOSO$_3$ | LQ 01 | 1-Ethyl-3-methylimidazolium ethylsulfate | 342573-75-5 |
| BMIM MeOSO$_3$ | LQ 02 | 1-Butyl-3-methylimidazolium methylsulfate | 401788-98-5 |
| LOW VISCOSITY | | | |
| EMIM SCN | VS 01 | 1-Ethyl-3-methylimidazolium thiocyanate | 331717-63-6 |
| BMIM SCN | VS 02 | 1-Butyl-3-methylimidazolium thiocyanate | 344790-87-0 |
| FUNCTIONALIZED | | | |
| COL Acetate | FS 85 | Choline acetate | 14586-35-7 |
| COL Salicylate | FS 65 | Choline salicylate | 2016-36-6 |
| MTEOA MeOSO$_3$ | FS 01 | Tris-(2-hydroxyethyl)-methylammonium methylsulfate | 29463-06-7 |

Cellulose dopes including ionic liquids having dissolved therein about 5% by weight underivatized cellulose are commercially available from Aldrich. These compositions utilize alkyl-methylimidazolium acetate as the solvent. It has been found that choline-based ionic liquids are not particularly suitable for dissolving cellulose.

In accordance with the invention, ionic liquids are used to dissolve cellulose. 1-allyl-3-methylimidazolium chloride for example, may be employed. The cellulose in an ionic liquid solution is precipitated by diluting the solution with water. It is this characteristic that is used to create novel paper structures of the present invention.

Figure 1:
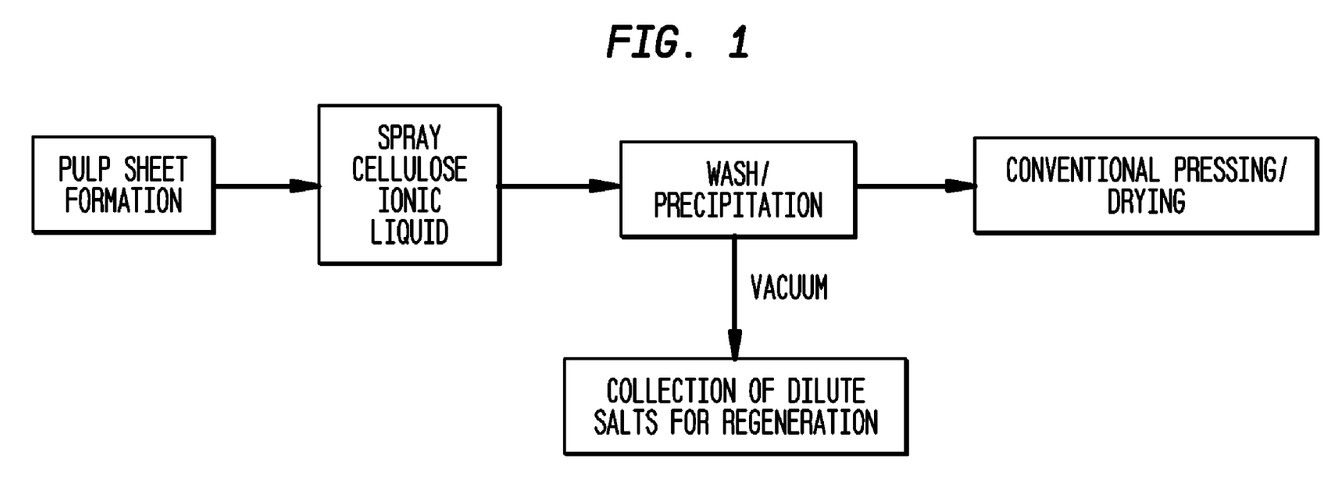
FIG. 1 is a schematic diagram illustrating a process of the present invention.

In one embodiment, a tissue web is formed conventionally with pulp and then sprayed with an ionic liquid cellulose solution as shown schematically in FIG. 1. The steps include: sheet formation; contacting the wet sheet with a cellulose ionic liquid solution; washing/precipitation; and ionic liquid recovery. The sheet is then dried in a conventional manner, including wet pressing, if so desired.

A spray pattern can be varied to impart the desired properties to the web. A Universal Fiber Depositer (UFD, available from Dynatec and described further below) may be one tool for applying the cellulose dope. Several examples shown in FIGS. 2-4 illustrate applications.

A pattern may be configured to impart stretchiness and strength to the sheet. The tissue web surface can be made softer (weaker) since the web can rely on precipitated cellulose for strength. CD stretch is particularly valuable since conventional papermaking processes have less than desired CD stretch. The pattern may be formed either on a tissue web or directly on a forming fabric. It may also be possible to hydro-entangle continuous cellulose filaments in a web.

Figure 2:
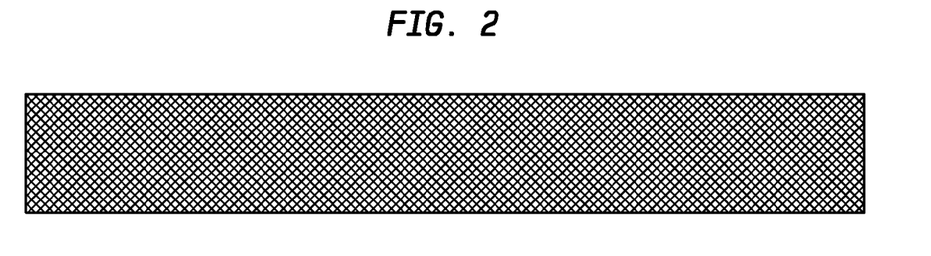
FIG. 2 is a schematic illustration of an X-network pattern of interconnected, regenerated cellulose filaments formed in-situ upon a web of papermaking fibers.

There is shown in FIG. 2, for example, an X pattern which gives strength and stretchiness to the sheet. The tissue pattern can be made softer or weaker depending on the application since the web can rely on precipitated cellulose for strength. CD stretch is particularly valuable since conventional papermaking processes produce sheet with less than desired CD stretch in many cases.

Figure 3:
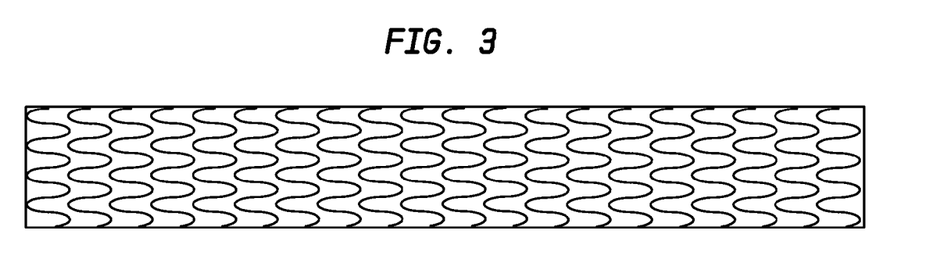
FIG. 3 is a schematic diagram of a sinusoidal pattern of interconnected, regenerated cellulose filaments formed in-situ upon a web of papermaking fibers.
Figure 4:
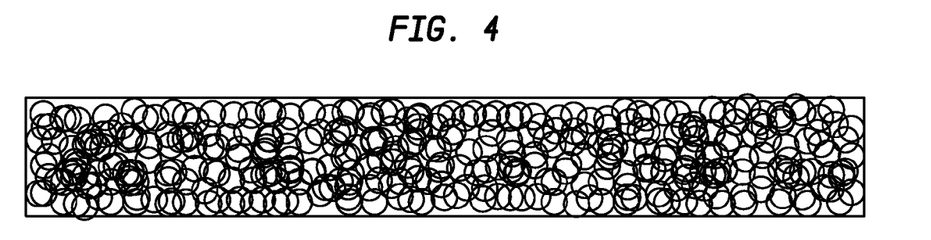
FIG. 4 is a schematic diagram of a circular network pattern of interconnected, regenerated cellulose filaments formed upon a web of papermaking fibers.

There is shown in FIG. 3 a sinusoidal pattern of regenerated cellulosic filaments formed in-situ on a cellulosic web. This pattern gives overall stretchiness, particularly in the CD (cross direction).

There is shown in FIG. 4 a circular network pattern of regenerated cellulosic filaments formed in-situ with the web.

In still other embodiments, regenerated cellulose fibers on the surface of the web may be used to create loops and free fiber ends for a velvety feel while still being well bonded to the sheet.

Any suitable extrusion apparatus may be used to extrude the cellulose dope into film or fiber and apply it to a web of papermaking fiber. One class of equipment is that used to extrude hot-melt adhesives. Such equipment includes Dynamelt® and Dynafiber® equipment supplied by ITW Dynatec of Hendersonville, Tenn. A Dynamelt® S5 adhesive supply unit (ASU) Model No. S1NUZED2-FGKLPR and a distribution head Model No. EQUFD30012VB102 may, for example, be used to deposit cellulose dopes on the web. Various aspects of this class of equipment are seen in U.S. Pat. No. 7,056,386 to Pahl and U.S Pat. No. 5,769,947 to Krappweis, the disclosures of which are incorporated herein by reference. A particularly preferred device which provides control is a Dynafiber® UFD (Uniform Fiber Deposition) device which provides control of fiber size and placement. Various aspects of this device are described in U.S. Pat. Nos. 5,904,298; 5,902,540; and 5,882,573, the disclosures of which are incorporated herein by reference.

Figure 5:
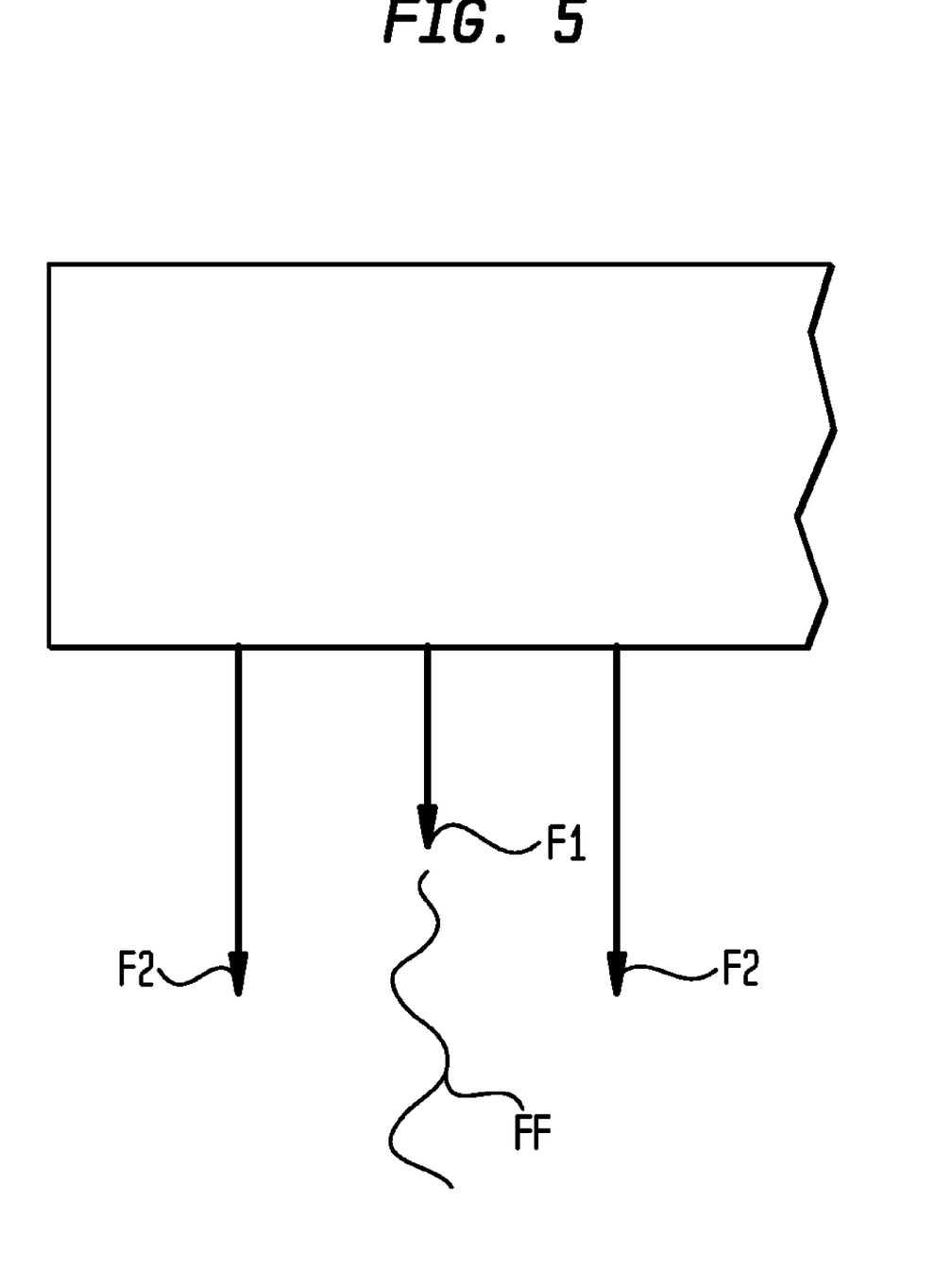
FIG. 5 is a schematic diagram illustrating pneumatically drawing extruded fibers of cellulosic dope.

One methodology which may be employed involves pneumatically drawing nascent fibers of cellulose dope as they are extruded. FIG. 5 is a diagrammatic view of an extrusion process or method wherein a cellulosic dope is dispensed to form a fluid flow F1 at a first velocity and heated air is dispensed to form separate second fluid flows F2 at a second velocity along substantially opposing flanking sides of the first fluid flow F1. According to this configuration, the first fluid flow F1 is located between the separate second fluid flows F2 to form an array of fluid flows as shown in FIG. 5. The second velocity of the second fluid flows F2 is greater than the first velocity of the first fluid flow F1 so that the second fluid flows F2 draw and attenuate the first fluid flow F1 to form a first fluid filament FF. The length of the arrows F1 and F2 is indicative of, though not proportional to, the relative velocities therebetween. The first fluid flow F1 and the second fluid flows F2 are directed generally non-convergently. FIG. 5 shows the first fluid flow F1 and flanking second fluid flows F2 directed in parallel, which maximizes the drawing effect of the shear component of the second fluid flows F2 on the first fluid flow F1. In other embodiments, however, it may be advantageous to divergently direct the first fluid flow F1 and the second fluid flows F2 to control application or dispensing of the fluid filament FF without substantially adversely affecting the shear component of the second fluid flows F2 available for drawing the first fluid flow F1.

The fibers so extruded are then disposed on a web of papermaking fibers and the cellulose is regenerated with water. It will be appreciated by one of skill in the art that the extruded cellulose dope fibers are pneumatically drawn as they are extruded similar to a melt-blowing process for thermoplastics.

Typical products may have a basis weight of from about 5 lbs/3000 ft$^2$ ream to about 50 lbs/3000 ft$^2$ ream. In many cases the product will have a basis weight of from about 7.5 lbs/3000 ft$^2$ ream to about 35 lbs/3000 ft$^2$ ream. In some embodiments, sheet products may include from about 1 weight percent to about 30 weight percent of regenerated cellulose microfibers while in other embodiments, high efficiency disposable cellulosic wipers include: (a) from about 90% by weight to about 25% by weight pulp-derived papermaking fiber; and (b) from about 10% to about 75% by weight regenerated cellulosic microfiber. Various ratios of pulp derived papermaking fiber to cellulose microfiber may be employed. For example the wiper may include from about 80 weight percent to a 30 weight percent pulp derived papermaking fiber and from about 20 weight percent to about 70 weight percent cellulose microfiber. Suitable ratios also include from about 70 percent by weight papermaking fiber to about 35 percent by weight pulp derived papermaking fiber and from about 30 percent by weight to about 65 percent by weight cellulose microfiber. Likewise, 60 percent to 40 percent by weight pulp derived papermaking fiber may be used with 40 percent by weight to about 60 percent by weight cellulose microfiber.

While the invention has been described in detail, modifications within the spirit and scope of the invention will be readily apparent to those of skill in the art. In view of the foregoing discussion, relevant knowledge in the art and references including co-pending applications discussed above in connection with the Background and Detailed Description, the disclosures of which are all incorporated herein by reference, further description is deemed unnecessary.

What is claimed is:

1. A method of making absorbent cellulosic sheet comprising:
   (a) forming a web of papermaking fibers;
   (b) extruding a cellulosic dope, the cellulosic dope comprising underivatized cellulose dissolved in a cellulose-dissolving solvent composition selected such that the cellulosic dope may be regenerated by contacting the dope with water;
   (c) disposing the cellulose dope upon the web; and
   (d) regenerating cellulose from the extruded dope in-situ, wherein the regenerated cellulose is in the form of discrete filaments capable of being hydro-entangled with the papermaking fibers.

2. The method according to claim 1, wherein the solvent composition comprises a cellulose-dissolving tertiary amine oxide.

3. The method according to claim 2, wherein the tertiary amine oxide is N-methylmorpholine-N-oxide (NMMO).

4. The method according to claim 1, wherein the solvent composition comprises a cellulose-dissolving ionic liquid.

5. The method according to claim 4, wherein the ionic liquid comprises an imidazolium salt.

6. The method according to claim 5, wherein the imidazolium salt is a dialkylimidazolium chloride.

7. The method according to claim 1, wherein the solvent composition comprises a non-solvent for the cellulose.

8. The method according to claim 1, wherein the regenerated cellulose filaments are bonded with papermaking fibers in the web.

9. The method according to claim 8, wherein the regenerated cellulose filaments are arranged in a sinuate pattern in the web.

10. The method according to claim 8, wherein the regenerated cellulose filaments are arranged in a sinusoidal pattern in the web.

11. The method according to claim 8, wherein the regenerated cellulose filaments form a network pattern in the web.

12. The method according to claim 9, wherein the regenerated cellulose filaments form an x-pattern network in the web.

13. The method according to claim 1, wherein the regenerated cellulose filaments form a circular network pattern in the web.

14. The method according to claim 1, further comprising the step of hydroentangling the regenerated cellulose filaments with the web.

15. The method according to claim 1, wherein cellulose is regenerated in the web by applying water to the web subsequent to applying the cellulose dope to the web.

16. The method according to claim 1, wherein the cellulosic dope is extruded as discrete filaments which are pneumatically drawn prior to contacting the web.

17. The method according to claim 1, wherein the discrete filaments of regenerated cellulose have a denier of from about 0.05 to about 20 g/9000 meters.

18. The method according to claim 1, wherein the discrete filaments of regenerated cellulose have a denier of from about 0.1 to about 10 g/9000 meters.

19. The method according to claim 1, wherein the regenerated cellulosic filaments are arranged in a sinuate pattern upon the web.

20. The method according to claim 1, wherein the regenerated cellulosic filaments form a network pattern upon the web.

* * * * *